(12) United States Patent
Zhamu et al.

(10) Patent No.: US 10,586,982 B2
(45) Date of Patent: Mar. 10, 2020

(54) ALKALI METAL-SULFUR SECONDARY BATTERY CONTAINING A HYBRID ANODE

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 104 days.

(21) Appl. No.: 15/665,608

(22) Filed: Aug. 1, 2017

(65) Prior Publication Data

US 2019/0044138 A1 Feb. 7, 2019

(51) Int. Cl.
| | | |
|---|---|---|
| *H01M 4/36* | (2006.01) | |
| *H01M 4/485* | (2010.01) | |
| *H01M 4/525* | (2010.01) | |
| *H01M 4/58* | (2010.01) | |
| *H01M 10/054* | (2010.01) | |

(52) U.S. Cl.
CPC .......... *H01M 4/525* (2013.01); *H01M 4/366* (2013.01); *H01M 4/485* (2013.01); *H01M 4/5805* (2013.01); *H01M 4/5815* (2013.01); *H01M 10/054* (2013.01)

(58) Field of Classification Search
CPC ...... H01M 4/136; H01M 4/366; H01M 4/485; H01M 4/525; H01M 4/5805; H01M 4/5815; H01M 10/3909; H01M 10/3918
See application file for complete search history.

(56) References Cited

U.S. PATENT DOCUMENTS

| | | | |
|---|---|---|---|
| 4,804,594 A | 2/1989 | Jow et al. | |
| 4,980,250 A | 12/1990 | Takahashi et al. | |
| 5,436,093 A | 7/1995 | Huang et al. | |
| 5,601,951 A | 2/1997 | Johnson et al. | |
| 5,635,151 A | 6/1997 | Zhang et al. | |
| 6,025,093 A | 2/2000 | Herr | |
| 6,335,115 B1 | 1/2002 | Meissner | |
| 6,706,447 B2 | 3/2004 | Gao et al. | |
| 7,276,314 B2 | 10/2007 | Gao et al. | |
| 8,158,282 B2 | 4/2012 | Zhamu et al. | |
| 8,241,793 B2 | 8/2012 | Zhamu et al. | |
| 2005/0130043 A1 | 6/2005 | Gao et al. | |
| 2006/0147799 A1* | 7/2006 | Hayashi | H01M 4/133 429/231.8 |
| 2006/0238203 A1* | 10/2006 | Kelley | G01R 31/389 324/433 |
| 2013/0224603 A1 | 8/2013 | Chen et al. | |
| 2014/0186716 A1* | 7/2014 | Wu | H01M 4/366 429/300 |
| 2014/0287295 A1* | 9/2014 | Honda | H01G 11/52 429/144 |
| 2015/0300956 A1* | 10/2015 | Fujieda | H01M 4/587 423/445 R |
| 2016/0043384 A1 | 2/2016 | Zhamu et al. | |

FOREIGN PATENT DOCUMENTS

| | | | |
|---|---|---|---|
| JP | 48-015063 B | * | 5/1973 |
| KR | 10-2014-0062202 | * | 5/2014 |
| WO | 2016012275 A1 | | 1/2016 |

OTHER PUBLICATIONS

"Polyvinylidene Fluoride (PVDF)", Porex Coropration, date unknown.*
Machine translation of Kr 10-2014-0062202, published on May 23, 2014 (Year: 2014).*
Machine translation of JP 48-015063B, published on May 11, 1973 (Year: 1973).*
PCT/US18/42204 International Search Report and Written Opinion dated Oct. 3, 2018, 8 pages.
Umeno et al. "Novel Anode Material for Lithium-Ion Batteries: Carbon-coated Silicon Prepared by Thermal Vapor Decomposition" Chemistry Letters (2001) pp. 1186-1187.
PCT/US18/42205 International Search Report and Written Opinion dated Oct. 16, 2018, 9 pages.

* cited by examiner

*Primary Examiner* — Anca Eoff

(57) ABSTRACT

Provided is an alkali metal-sulfur cell comprises: (A) an anode comprising (i) an anode active material layer composed of fine particles of a first anode active material, an optional conductive additive, and an optional binder and, prior to assembly of the cell, (ii) a layer of an alkali metal or alkali metal alloy having greater than 50% by weight of lithium, sodium, or potassium therein, wherein the layer of alkali metal or alkali metal alloy is in physical contact with the anode active material layer; (B) a cathode active material layer and an optional cathode current collector, wherein the cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof; and (C) an electrolyte in ionic contact with the anode active material layer and the cathode active material layer.

39 Claims, 6 Drawing Sheets

ALKALI METAL-SULFUR SECONDARY BATTERY CONTAINING A HYBRID ANODE

FIELD OF THE INVENTION

The present invention provides a unique anode composition and structure in a secondary or rechargeable alkali metal-sulfur battery, including the lithium-sulfur battery, sodium-sulfur battery, and potassium-sulfur battery.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^0$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.

(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.

(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.

(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

Despite the various approaches proposed for the fabrication of high energy density Li—S cells, there remains a need for anode and cathode materials and structures, production processes, and cell operation methods that retard the out-diffusion of S or lithium polysulfide from the cathode compartments into other components in these cells, improve the utilization of electro-active cathode materials (S utilization efficiency), and provide rechargeable Li—S cells with high capacities over a large number of cycles. The anode structure must also address the lithium dendrite issue.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, (iii) low Coulombic efficiency, and (iv) dendrite-induced internal shorting. Again, these drawbacks arise mainly from insulating nature of S, dissolution of S and Na or K polysulfide intermediates in liquid electrolytes (and related Shuttle effect), and large volume change during charge/discharge.

Hence, an object of the present invention is to provide a rechargeable alkali metal battery (e.g Li—S, Na—S, and K—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, and more preferably greater than 600 Wh/Kg (all based on the total cell weight).

Another object of the present invention is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable alkali metal-sulfur cell based on rational materials and battery designs that overcome or significantly reduce the following issues commonly associated with conventional Li—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) dissolution of S and alkali metal polysulfide in electrolyte; (d) migration of polysulfides from the cathode to the anode (which irreversibly react with lithium, or Na or K at the anode), resulting in active material loss and capacity decay (the shuttle effect); and (e) short cycle life.

SUMMARY OF THE INVENTION

The present invention provides an alkali metal-sulfur cell (e.g. lithium-sulfur cell, sodium-sulfur cell, and potassium-sulfur cell). The alkali metal-sulfur cell comprises:

(a) an anode comprising (i) an anode active material layer composed of fine particles of a first anode active material having an average size from 1 nm to 10 μm, an optional conductive additive, and an optional binder that bonds the fine particles and the conductive additive together to form the anode active material layer of structural integrity and, prior to assembly of the cell, (ii) a layer of an alkali metal or alkali metal alloy having greater than 50% by weight (preferably >80%) of lithium, sodium, or potassium therein, wherein the layer of alkali metal or alkali metal alloy is in physical contact with the anode active material layer and provides from 1% to 120% of a required alkali metal storage capacity of said anode (the excess 20% beyond 100% being intended for compensating for lithium loss due to side reactions);

(b) a cathode active material layer and an optional cathode current collector supporting the cathode active material layer, wherein the cathode active material layer contains a sulfur-containing material selected from a sulfur-carbon hybrid, sulfur-graphite hybrid, sulfur-graphene hybrid, conducting polymer-sulfur hybrid, metal sulfide, a sulfur compound, elemental sulfur, or a combination thereof and (c) an electrolyte with an optional porous separator layer in ionic contact with the anode active material layer and the cathode active material layer.

In the rechargeable alkali metal-sulfur cell, lithium, sodium, or potassium ions or atoms are released from the alkali metal alkali metal alloy and diffuse into the first anode active material particles to form lithiated, sodiated, or potassiated anode particles after the battery is assembled and the anode is brought into contact with the electrolyte.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from meso-phase pitch, meso-phase carbon, meso carbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive polymer selected from polyaniline, polypyrrole, polythiophene, polyfuran, a bi-cyclic polymer, a sulfonated derivative thereof, or a combination thereof.

The instant rechargeable alkali metal-sulfur cell typically has a sulfur utilization efficiency from 80% to 99%, more typically from 85% to 97%.

In the rechargeable alkali metal-sulfur cell, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof. The electrolyte may contain a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluorom-ethyl sulfonylimide lithium ($LiN(CF_3SO_2)_2$), Lithium bis (oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bisperfluoroethysulfonylimide (Li-BETI), an ionic liquid salt, sodium perchlorate ($NaClO_4$), potassium perchlorate ($KClO_4$), sodium hexafluorophos-phate ($NaPF_6$), potassium hexafluorophosphate ($KPF_6$), sodium borofluoride ($NaBF_4$), potassium borofluoride ($KBF_4$), sodium hexafluoroarsenide, potassium hexafluoro-arsenide, sodium trifluoro-metasulfonate ($NaCF_3SO_3$), potassium trifluoro-metasulfonate ($KCF_3SO_3$), bis-trifluo-romethyl sulfonylimide sodium ($NaN(CF_3SO_2)_2$), sodium trifluoromethanesulfonimide (NaTF SI), bis-trifluoromethyl sulfonylimide potassium ($KN(CF_3SO_2)_2$), or a combination thereof.

The solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma-butyrolac-tone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethyl-ene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer contains an anode active material selected from lithium metal, sodium metal, potassium metal, a lithium metal alloy, sodium metal alloy, potassium metal alloy, a lithium inter-calation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

The rechargeable alkali metal-sulfur cell may be a lithium ion-sulfur cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, car-bides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof and combinations thereof.

The rechargeable alkali metal-sulfur cell may be a sodium ion-sulfur cell or potassium ion-sulfur cell and, in this case, the anode active material layer contains an anode active material selected from the group consisting of: (a) Sodium-or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, car-bides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof; and combinations thereof.

Preferably, in the rechargeable alkali metal-sulfur cell, the particulates contain from 80% to 99% by weight of sulfur, metal sulfide, or metal compound based on the total weight of the high-capacity polymer and the sulfur, metal sulfide, or metal compound combined.

The present invention also provides a cathode active material layer for a rechargeable alkali metal-sulfur cell. This cathode active material layer preferably contains mul-tiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates is composed of one or a plurality of sulfur-containing material particles being embraced or encapsulated by a thin layer of a high-elasticity polymer having a recoverable tensile strain no less than 10% when measured without an additive or reinforcement, a lithium ion conductivity no less than $10^{-5}$ S/cm at room temperature (typically up to $5 \times 10^{-2}$ S/cm), and a thickness from 0.5 nm to 10 μm (preferably and typically from 1 nm to 1 μm, more preferably <100 nm).

In this product (a cathode layer), the sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

In this cathode active material layer product, the high-elasticity polymer preferably contains a cross-linked network of polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in the cross-linked network of polymer chains. Preferably, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the cathode active material layer, the metal sulfide may contain $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The carbon or graphite material in the cathode active material layer may be selected from meso-phase pitch, meso-phase carbon, meso carbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

This cathode active material layer further comprises a binder resin that bonds the multiple particulates together to form the cathode active material layer, wherein the binder resin is not part of the multiple particulates (i.e. not included inside the core portion of a particulate) and is external to the multiple particulates. In other words, the high-elasticity polymer does not embrace the binder resin.

In the alternative, the present invention also provides a cathode active material layer for a rechargeable alkali metal-sulfur cell, wherein the cathode active material layer contains a resin binder, an optional conductive additive, and multiple particles of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof, wherein the sulfur-containing material particles are bonded by the resin binder to form an integral solid layer (a layer of adequate structural integrity so that it can be freely-standing), and wherein the integral solid layer is covered and protected by a thin layer of a high-elasticity polymer having a recoverable tensile strain no less than 10% when measured without an additive or reinforcement, a lithium ion conductivity no less than $10^{-5}$ S/cm at room temperature, and a thickness from 0.5 nm to 10 μm. In some embodiments, the integral solid layer is bonded by the resin binder to a cathode current collector.

Preferably, the cathode active material includes multiple particulates obtained by encapsulating or embracing one or a plurality of sulfur-containing material particles with a thin layer of high-elasticity polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In the instant Li—S cell, the reversible specific capacity of the sulfur cathode is typically and preferably no less than 1,000 mAh per gram and often exceeds 1,200 or even 1,500 mAh per gram of entire cathode layer. The high specific capacity of the presently invented cathode, when combined with a lithium anode, typically leads to a cell specific energy significantly greater than 400 Wh/Kg, based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 500 Wh/Kg and, in some examples, exceeds 600 Wh/kg.

The present invention also provides an anode electrode layer for an alkali metal-sulfur battery; the anode electrode layer comprising (a) an anode active material layer composed of fine particles of a first anode active material having an average size from 1 nm to 10 μm, an optional conductive additive, and an optional binder that bonds the fine particles and the conductive additive together to form the anode active material layer of structural integrity and (b) a layer of alkali metal or alkali metal alloy having greater than 50% by weight of alkali metal therein, wherein the layer of alkali metal or alkali metal alloy is in physical contact with the anode active material layer and the alkali metal in this layer of alkali metal or alkali metal alloy is selected from Na, K, a combination of Na and K, or a combination thereof with Li. This alkali metal in this layer does not refer to lithium alone. The anode electrode layer may further comprise an anode current collector wherein the anode active material layer is supported by or bonded to said anode current collector.

In certain embodiments, the anode active material layer or the layer of alkali metal or alkali metal alloy further contains an amount of electrolyte or alkali metal ion-conducting liquid. The electrolyte may be selected from organic liquid electrolyte, ionic liquid electrolyte, gel electrolyte, polymer electrolyte, solid-state electrolyte, or a combination thereof.

The anode electrode layer may further comprise a protective film that covers the layer of alkali metal or alkali metal alloy, preventing its contact with air moisture or oxygen.

The first anode active material particles preferably have an average particle size from 1 nm to 1 μm, further preferably from 1 nm to 100 nm.

The first anode active material is preferably selected from the group consisting of: (a) silicon (Si), germanium (Ge), tin (Sn), lead (Pb), antimony (Sb), bismuth (Bi), zinc (Zn), aluminum (Al), and cadmium (Cd); (b) alloys or intermetallic compounds of Si, Ge, Sn, Pb, Sb, Bi, Zn, Al, or Cd with other elements, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, or Cd, and their mixtures or composites; and (d) combinations thereof.

The anode may further comprise an amorphous carbon or polymeric carbon that forms a coating on a surface of the fine particles or form a matrix in which the fine particles are dispersed. The amorphous or polymeric carbon coating preferably has a thickness less than 1 μm. The anode amorphous or polymeric carbon may be obtained from pyrolization of a polymer, pitch, or organic precursor, or obtained by chemical vapor deposition.

In certain embodiments, the anode active layer further comprises a protective material that forms a coating on a surface of said fine particles or form a matrix in which said fine particles are dispersed. The protective material is preferably selected from graphene, an electron-conducting polymer, an ion-conducting polymer, a carbon coating, or a combination thereof.

The conductive additive may be in a form of a porous mat, fabric, paper, or foam of carbon/graphite fibers, carbon nanotubes, graphene sheets, expanded graphite flakes, metal nanowires, or a combination thereof.

In certain embodiments, the anode further comprises a desired amount of a second anode active material selected from particles or filaments of graphite, hard carbon, soft carbon, meso-carbon micro-bead, surface-modified graphite, carbon-coated graphite, or a combination thereof.

Preferably, the anode comprises a conductive additive selected from the group consisting of carbon black, electro-spun nanofibers, carbonized electro-spun nanofibers, vapor-grown carbon or graphite nanofibers, carbon or graphite whiskers, carbon nanotubes, graphene sheets, metal nanowires, metal-coated nanowires, carbon-coated nanowires, metal-coated nanofibers, carbon-coated nanofibers, and combinations thereof.

In the anode electrode layer, the anode active layer may further comprise a porous separator layer that protects the alkali metal or alkali metal alloy layer (with or without the use of an additional protective film or paper).

DETAILED DESCRIPTION OF PREFERRED EMBODIMENTS

For convenience, the following discussion of preferred embodiments is primarily based on Li—S cells, but the same or similar composition, structure, and methods are applicable to Na—S and K—S cells. Examples are presented for Li—S cells, room-temperature Na—S cells, and K—S cells.

The present invention, as an example, provides a lithium ion battery that comprises a sulfur cathode, an anode, an electrolyte in ionic contact with both the cathode and the anode, and an optional separator disposed between the cathode and the anode. This optional separator is not required if the electrolyte is a solid-state electrolyte.

Figure 2A:
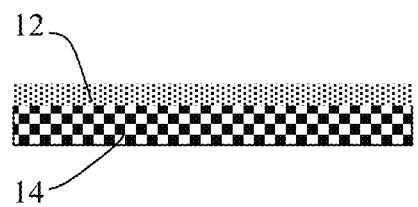
FIG. 2(a) an anode electrode composed of an anode active material layer and a lithium metal or alloy layer covering the anode active material layer according to a preferred embodiment of the present invention.
Figure 2B:
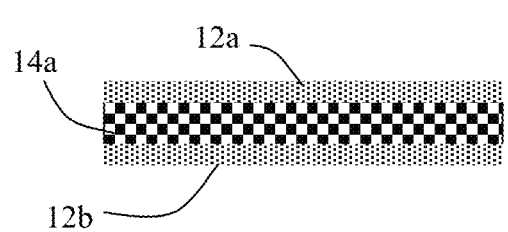
FIG. 2(b) an anode electrode composed of an anode active material layer and two lithium metal or Li alloy layers covering the two primary surfaces of the anode active material layer according to another preferred embodiment of the present invention.

The sulfur cathode preferably comprises a cathode active material layer and an optional cathode current collector supporting said cathode active material layer, wherein said cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof Prior to the battery being assembled or immediately after the battery assembling, the anode comprises (a) an anode active material layer (e.g. numeral 14 in FIG. 2(a)) composed of fine particles of a first anode active material having an average size from 1 nm to 10 μm (preferably from 1 nm to 1 μm and further preferably from 1 nm to 100 nm), an optional conductive additive, and an optional binder that bonds the fine particles and the conductive additive together to form the anode active material layer of structural integrity and (b) a layer of lithium metal or lithium metal alloy (e.g. 12 in FIG. 2(b)) having greater than 50% by weight (preferably greater than 80%) of lithium therein, wherein the layer of lithium metal or lithium metal alloy is in physical contact with the anode active material layer and provides from 1% to 120% of a required lithium storage capacity of the anode layer. This layer of lithium metal or lithium metal alloy is typically from 1 nm to 100 μm in thickness. The anode active layer or the layer of lithium metal or lithium metal alloy, prior to battery assembly, may further contain an amount of electrolyte. For a Na—S or K—S cell, the lithium metal or lithium metal alloy is replaced by Na or K metal, or Na or K metal alloy.

Figure 2C:
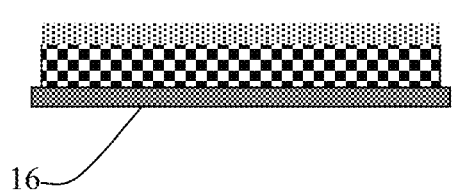
FIG. 2(c) a current collector-supported anode electrode composed of an anode active material layer and a lithium metal or alloy layer covering the anode active material layer according to a preferred embodiment of the present invention.
Figure 2D:
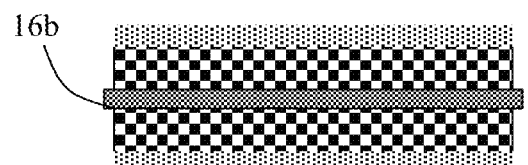
FIG. 2(d) an anode electrode composed of an anode active material layer and a lithium metal or alloy layer covering the anode active material layer on each primary surface of a current collector (having 2 primary surfaces), according to another preferred embodiment of the present invention.

In certain embodiments, as illustrated in FIG. 2(b), an anode active layer (14a) may be coated with two separate layers (12a, 12b) of lithium metal or lithium metal alloy. FIG. 2(c) shows that an anode can contains an anode current collector (e.g. a Cu foil, 16) to support the anode active layer and lithium metal or alloy layer. Alternatively, as illustrated in FIG. 2(d), one current collector (16b) may be used to support one anode active layer and one lithium metal or alloy layer on each side (primary surface) of the two sides of the current collector. Again, for a Na—S or K—S cell, the lithium metal or lithium metal alloy in the above description is replaced by Na or K metal, or Na or K metal alloy.

Figure 1A:
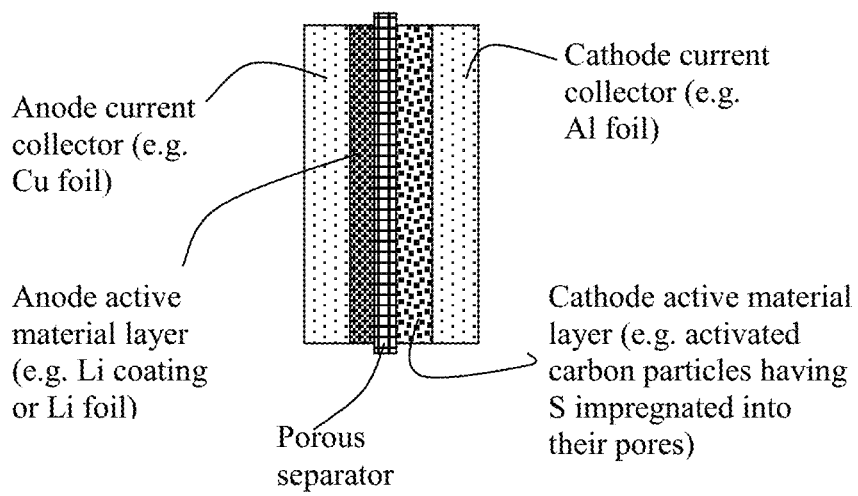
FIG. 1(A) Schematic of a prior art alkali metal-sulfur battery cell.
Figure 1B:
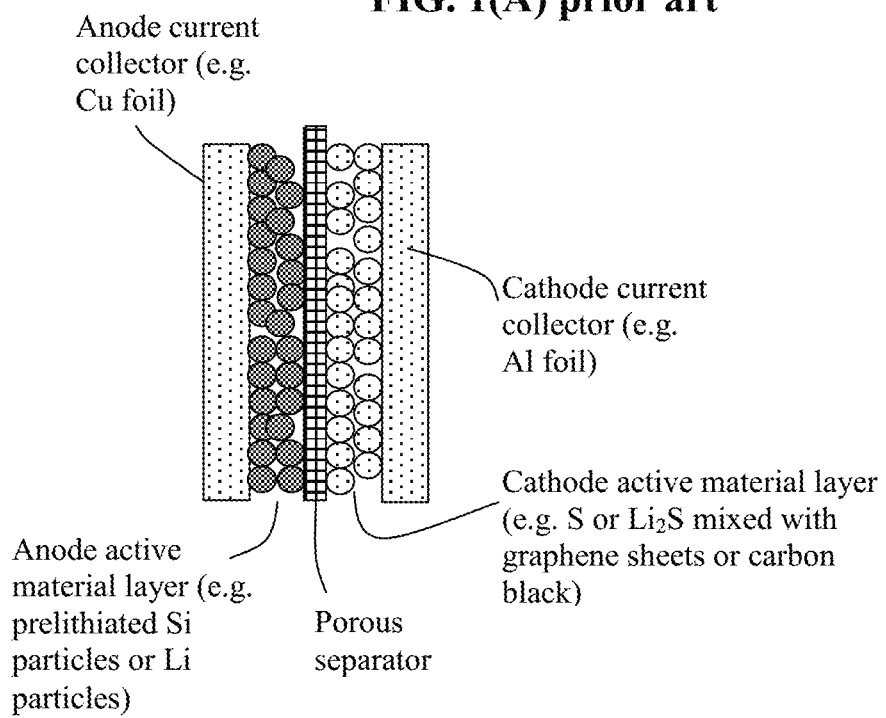
FIG. 1(B) Schematic of another prior art alkali metal-sulfur battery cell.

In a conventional Li-ion or Li—S battery, lithiation of an anode active material (e.g., Si particles in FIG. 1(B)) during the charging operation of the battery is known to induce a volume change in the anode active material by 300-400% of its original volume. Such highly dilated particles are extremely brittle and prone to pulverization or fragmentation. During the repeated charge/discharge cycles, the anode active material tends to quickly become pulverized and the resulting fragments lose contacts with the conductive additive and the current collector. Those fragments are no longer active in providing electrons to the external circuit. The anode configuration of the prior art Li—S cell illustrated in FIG. 1(A) has dendrite and related internal shorting issues.

Again, using the Li—S cell as an example, the presently invented approach enables free expansion of the high-capacity anode active material (e.g. Si and $SnO_2$ particles) in a controlled manner. Some volume expansion may be allowed to occur outside of the intended battery cell (provided electrolyte is present in the anode prior to battery assembling). These particles, upon lithiation (intercalation by lithium ions from the lithium metal or alloy layer), expands their volume into the intentionally implemented pores in the anode active material layer or into the space created by lithium metal or alloy layer due to release of lithium atoms. In the former mechanism, the pores are present between active material particles and the porous binder resin. By making the binder resin porous (e.g. by using a foaming agent), one could produce additional spaces to accommodate the expanded volume of active material particles, leading to improved cycle life of the resulting lithium-sulfur battery.

After the anode electrode, a porous separator, and a cathode are assembled into a cell and the electrolyte is injected into the cell, lithium ions are released from the layer of lithium metal or alloy and diffuse into the anode active material particles to conduct the pre-designed pre-lithiation in a controlled manner, prior to the first charge or discharge of the battery.

Furthermore, even though such lithiated particles could still shrink/expand in volume during the subsequent discharge/charge process when lithium is extracted out of or intercalate into the anode active material, we have surprisingly found that the resulting anode was capable of maintaining a high capacity for a much longer cycle life compared with conventional anode structures. Presumably, repeated shrinkage/expansion of these lithiated particles did not lead to loss of contacts with conductive additives (e.g., carbon black or fine graphite particles) and the current collector during the subsequent discharge and charge cycles.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles. Preferably, the above sulfur-containing compound may be encapsulated by a high-elasticity polymer having a recoverable tensile elastic deformation of greater than 2% (from 2% to 700%), preferably >10%, and further preferably >100%.

In this cathode active material layer product, the high-elasticity polymer preferably contains a cross-linked network of polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in the cross-linked network of polymer chains. Preferably, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from meso-phase pitch, meso-phase carbon, meso carbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive polymer selected from polyaniline, polypyrrole, polythiophene, polyfuran, a bi-cyclic polymer, a sulfonated derivative thereof, or a combination thereof. This can be a simple mixture of sulfur or metal sulfide with a conducting polymer.

In certain embodiments, the high-elasticity polymer contains from 0.1% to 50% by weight of a lithium ion-conducting additive dispersed therein, or contains therein from 0.1% by weight to 10% by weight of a reinforcement nano filament selected from carbon nanotube, carbon nanofiber, graphene, or a combination thereof. The lithium ion-conducting additive to form a composite wherein said lithium ion-conducting additive is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

The lithium ion-conducting additive may be dispersed in the high-elasticity polymer and may be selected from lithium perchlorate, LiClO$_4$, lithium hexafluorophosphate, LiPF$_6$, lithium borofluoride, LiBF$_4$, lithium hexafluoroarsenide, LiAsF$_6$, lithium trifluoro-metasulfonate, LiCF$_3$SO$_3$, bis-trifluoromethyl sulfonylimide lithium, LiN(CF$_3$SO$_2$)$_2$, lithium bis(oxalato)borate, LiBOB, lithium oxalyldifluoroborate, LiBF$_2$C$_2$O$_4$, lithium oxalyldifluoroborate, LiBF$_2$C$_2$O$_4$, lithium nitrate, LiNO$_3$, Li-Fluoroalkyl-Phosphates, LiPF$_3$(CF$_2$CF$_3$)$_3$, lithium bisperfluoro-ethysulfonylimide, LiBETI, lithium bis(trifluoromethanesulphonyl) imide, lithium bis(fluorosulphonyl)imide, lithium trifluoromethanesulfonimide, LiTF SI, an ionic liquid-based lithium salt, or a combination thereof.

Figure 3:
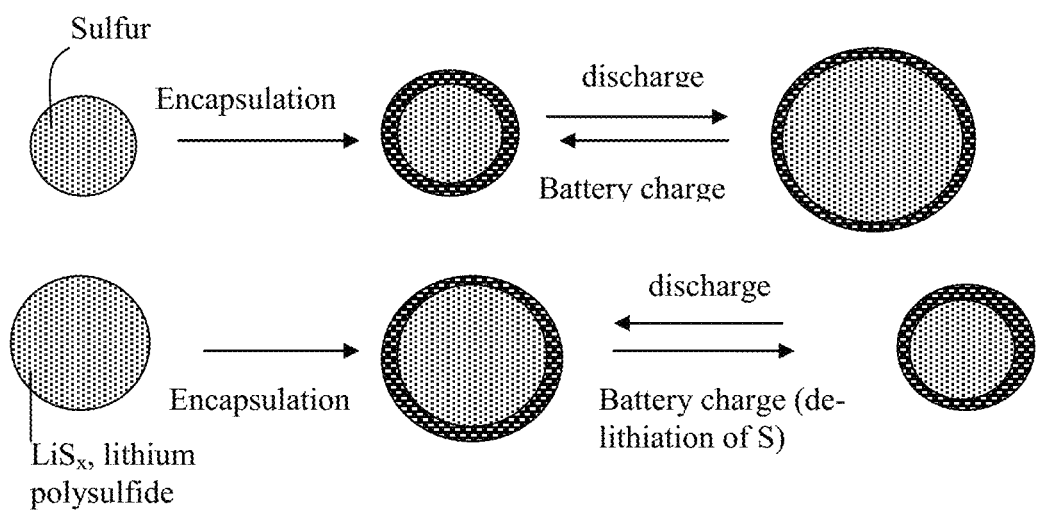
FIG. 3 Schematic of high-elasticity polymer-encapsulated particles of a cathode active material. The high elastic deformation of the polymer shell enables the shell to expand and contract congruently and conformably with the core particle.

As schematically illustrated in the upper portion of FIG. 3, a sulfur-based particle can be encapsulated by a high-capacity polymer shell to form a core-shell structure (sulfur core and polymer shell in this example). As the lithium-sulfur battery is discharged, the cathode active material (e.g. sulfur in the high-capacity polymer-encapsulated S/CNT particle) reacts with lithium ions to form lithium polysulfide which expands in volume. Due to the high elasticity of the encapsulating shell (the high-capacity polymer), the shell will not be broken into segments (in contrast to the broken carbon shell). That the high-capacity polymer shell remains intact, preventing the exposure of the underlying lithium sulfide to electrolyte and, thus, preventing the lithium sulfide from dissolving in the electrolyte during repeated charges/discharges of the battery. This strategy prevents continued migration of lithium polysulfide to the anode side which reacts with lithium and is unable to return to the cathode (the shuttle effect). This shuttle effect is mainly responsible for continued capacity decay in a conventional Li—S, Na—S, or K—S cell.

Alternatively, referring to the lower portion of FIG. 3, lithium sulfide is used as the cathode active material. A layer of high-capacity polymer may be encapsulated around the lithium polysulfide particle to form a core-shell structure. When the Li—S battery is charged and lithium ions are released from the cathode, the cathode active material particle contracts. However, the high-capacity polymer is capable of elastically shrinking in a conformal manner; hence, leaving behind no gap between the protective shell and the sulfur. Such a configuration is amenable to subsequent lithium reaction with sulfur. The high-capacity polymer shell expands and shrinks congruently with the expansion and shrinkage of the encapsulated core cathode active material particle, enabling long-term cycling stability of a lithium battery.

The anode active material layer of a prior art alkali metal-sulfur cell can contain a foil or coating of Li, Na, or K supported by a current collector (e.g. Cu foil), as illustrated in the left-hand portion of FIG. 1(A) for a prior art Li—S cell. Alternatively, the anode active material may contain, for instance, particles of pre-lithiated Si particles or surface-stabilized Li particles, as illustrated in the left-hand portion of FIG. 2(B). However, we have surprisingly discovered that the presently invented hybrid anode enable a resulting alkali metal-sulfur battery to exhibit a significantly longer and more stable charge/discharge cycling life as compared to all prior art anode structures. The hybrid anode also essentially eliminates the dendrite problems of a rechargeable lithium metal, sodium metal, or potassium metal cell.

The electrolyte for an alkali metal-sulfur cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium [LiN(CF$_3$SO$_2$)$_2$], lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF3(CF$_2$CF$_3$)$_3$), lithium bisperfluoroethysulfonylimide (LiBETI), an ionic liquid salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN (CF$_3$SO$_2$)$_2$), sodium trifluoromethanesulfonimide (NaTFSI), and bis-trifluoromethyl sulfonylimide potassium (KN(CF$_3$SO$_2$)$_2$). Among them, LiPF$_6$, LiBF$_4$ and LiN (CF$_3$SO$_2$)$_2$ are preferred for Li—S cells, NaPF$_6$ and LiBF$_4$ for Na—S cells, and KBF$_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In the preferred cathode active material powder, the core material (to be encapsulated by a thin layer of high-elasticity polymer) contains the sulfur-carbon hybrid, sulfur-graphite hybrid, sulfur-graphene hybrid, conducting polymer-sulfur hybrid, metal sulfide, sulfur compound, etc. These hybrid or compound materials are produced in the form of particles that contain a mixture, blend, composite, or bonded entity of sulfur or sulfide with a carbon, graphite, graphene, or conducting polymer material. Metal sulfides (e.g. lithium polysulfide, sodium polysulfide, etc.) and sulfur compounds are readily available in a fine particle form. Sulfur can be combined with a conducting material (carbon, graphite, graphene, and/or conducting polymer) to form a composite, mixture, or bonded entity (e.g. sulfur bonded on graphene oxide surface).

There are many well-known procedures that can be used to make the aforementioned sulfur-containing materials into particles. For instance, one may mix solid sulfur with a carbon or graphite material to form composite particles using ball-milling. The resulting particles are typically ellipsoidal or potato-like in shape having a size from 1 to 20 μm. Also, one may infiltrate S or sulfide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit sulfur onto surfaces of graphene sheets, CNTs, carbon nanofibers, etc. and then form these S-coated nano materials into a spherical or ellipsoidal shape using high-intensity ball-milling, spray-drying (of their suspensions), aerosol formation, etc. These particles are then encapsulated with a high-elasticity polymerusing the micro-encapsulation processes discussed above.

The cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells and there has been no solution to this problem.

Thus, it is highly advantageous to obtain a high sulfur loading and yet, concurrently, maintaining an ultra-thin/small thickness/diameter of sulfur for significantly enhanced sulfur utilization efficiency, energy density and power density. For instance, one can deposit nano-scaled sulfur (1-5 nm thick) on graphene surfaces using chemical, electrochemical, or vapor deposition to form S-coated or S-bonded graphene sheets. These S-coated or S-bonded graphene sheets are then aggregated together using a tumbling mixing, ball-milling, or spraying procedure. These steps enable the preparation of S-conducting material hybrids that contain 85%-99% by weight sulfur, yet maintaining a coating thickness or particle diameter from 1 nm to 5 nm. This ultra-small dimension enables fast lithium diffusion and lithium-sulfur reactions, leading to high S utilization efficiency (hence, high energy density) even at high charge-discharge rates. By implementing a high-elasticity polymer around these hybrid particles or sulfur compound/sulfide particles, we have significantly reduced and even eliminated the shuttling effect, resulting in an alkali metal battery that has long cycle-life.

Again, the shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It appears that the embracing high-elasticity polymer has effectively trapped sulfur and metal polysulfide therein, thereby preventing or reducing such a dissolution and migration issue. We have solved the most critical, long-standing problem of alkali metal-sulfur batteries.

This cathode active material layer may further comprise a binder resin that bonds the multiple particulates (of encapsulated sulfur-containing particles) together to form the cathode active material layer. In the aforementioned cathode active material layer, the binder resin is not part of the multiple particulates (i.e. not included inside the core portion of a particulate) and is external to the multiple particulates. The high-elasticity polymer does not embrace the binder resin and the binder resin is not embedded in the high-elasticity polymer.

In an alternative structure, the cathode active material layer for a rechargeable alkali metal-sulfur cell may contain a resin binder, an optional conductive additive, and multiple particles of a sulfur-containing material, wherein the binder resin helps to bond the sulfur-containing particles together to form a solid layer of structural integrity. This solid layer may be supported by a cathode current collector (e.g. Al foil). This solid layer is covered and protected by a layer of high-elasticity polymer.

In this solid layer, the sulfur-containing material is selected from a sulfur-carbon hybrid, sulfur-graphite hybrid, sulfur-graphene hybrid, conducting polymer-sulfur hybrid, metal sulfide, sulfur compound, or a combination thereof. Again, and more specifically, the sulfur-containing material particles are bonded by the resin binder to form an integral solid layer (a layer of adequate structural integrity so that it can be freely-standing), and the integral solid layer is covered and protected by a thin layer of a high-elasticity polymer having a recoverable tensile strain no less than 10% when measured without an additive or reinforcement, a lithium ion conductivity no less than $10^{-5}$ S/cm at room temperature, and a thickness from 0.5 nm to 10 μm. The integral solid layer may be bonded by the resin binder to a cathode current collector.

Such a high-elasticity polymer protective layer can be formed by spraying the precursor mass (monomer or oligomer with the required initiator or curing agent) over a pre-made cathode active material layer and then polymerized and cross-linked.

The invention also provides a rechargeable alkali metal-sulfur cell that contains such a cathode active material layer, wherein the entire layer is covered and protected by a high-elasticity polymer. This alkali metal-sulfur cell comprises: (a) a hybrid anode (containing an anode active material layer and a layer of alkali metal or alloy) and an optional anode current collector supporting the anode active material layer; (b) a cathode that contains this cathode active material layer; and (c) an electrolyte with an optional porous separator layer in ionic contact with the anode active material layer and the cathode active material layer. Effectively, this high-elasticity polymer protective layer is implemented between the cathode active layer and the porous separator.

In all versions of the above-discussed alkali metal-sulfur cells, the anode active material in the anode active material layer may contain, as an example, a high-capacity Si, Sn, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, $SnO_2$, etc.).

At the anode side, when lithium metal is used as the sole anode active material in a Li—S cell, there is concern about the formation of lithium dendrites, which could lead to internal shorting and thermal runaway. Herein, we have used the hybrid anode to address these problems. In the anode, one may further include some conductive nanofibers to enhance the anode conductivity and, more significantly, the uniformity of lithium intercalation in the anode.

Nanofibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nanofibers, followed by carbonization of PAN. It may be noted that some of the pores in the structure, as carbonized, are greater than 100 nm and some smaller than 100 nm.

The following examples are presented primarily for the purpose of illustrating the best mode practice of the present invention and should not be construed as limiting the scope of the present invention.

Example 1: Anode Electrode Containing Amorphous Carbon-Protected Si Particles and Cathode Containing Sulfur-Coated Graphene Sheets The step of sulfur cathode active material production involves producing vapor of elemental sulfur, allowing deposition of S vapor on surfaces of single-layer or few-layer graphene sheets. The graphene sheets, suspended in a liquid medium (graphene oxide in water or graphene in NMP), were sprayed onto a substrate (e.g. glass surface) to form a thin layer of graphene sheets. This thin layer of graphene was then exposed to sublimation-generated physical vapor deposition. Sublimation of solid sulfur occurs at a temperature greater than 40° C., but a significant and practically useful sublimation rate typically does not occur until the temperature is above 100° C. We typically used 117-160° C. with a vapor deposition time of 10-120 minutes to deposit a thin film of sulfur on graphene surface (sulfur thickness being approximately from 1 nm to 10 nm). This thin layer of graphene having a thin film of sulfur deposited thereon was then easily broken into pieces of S-coated graphene sheets using an air jet mill. Some of these sheets were made into secondary particles of approximately 5-15 μm in diameter (e.g. via spray-drying) and then half of these secondary particles were encapsulated by a high-elasticity polymer, ethoxylated trimethylopropane triacrylate monomer (ETPTA). ETPTA will be further discussed in Example 4 below.

Three types of lithium-sulfur cells were prepared, all based on S-coated graphene sheet particles as the cathode active material. In the first cell (a control cell), the anode electrode was prepared by using slurry coating of prelithiated Si particles coated with amorphous carbon (13% after carbonization of phenolic resin) and bonded by PVDF (as the binder resin). The anode active material layer was coated on a Cu foil surface.

In the second cell, the anode electrode was prepared by using slurry coating of Si particles coated with amorphous carbon (13% after carbonization of phenolic resin) and bonded by PVDF. Expanded graphite platelets were used as a conductive additive. After the anode active material layer was fabricated on a Cu foil surface, the layer was pre-lithiated electrochemically in an external electrochemical plating bath wherein a lithium metal foil was used as the counter electrode and $LiPF_6$-EC/PC as the electrolyte. After this external pre-lithiation procedure, the electrode was dried in a vacuum oven.

In the third cell, the anode electrode was prepared by using slurry coating of Si particles coated with amorphous carbon (13% after carbonization of phenolic resin) and bonded by PVDF. After the anode active material layer was fabricated on a Cu foil surface, the active material layer was subjected to physical vapor deposition of lithium that forms a layer of lithium metal coated on a primary surface of the anode active material layer. The resulting anode electrode, a porous separator (Celgard film), and a cathode layer were then laminated into a unit cell, packaged in an aluminum-plastic envelop, and injected with a liquid electrolyte ($LiPF_6$-EC/PC) to make a cell.

Figure 4:
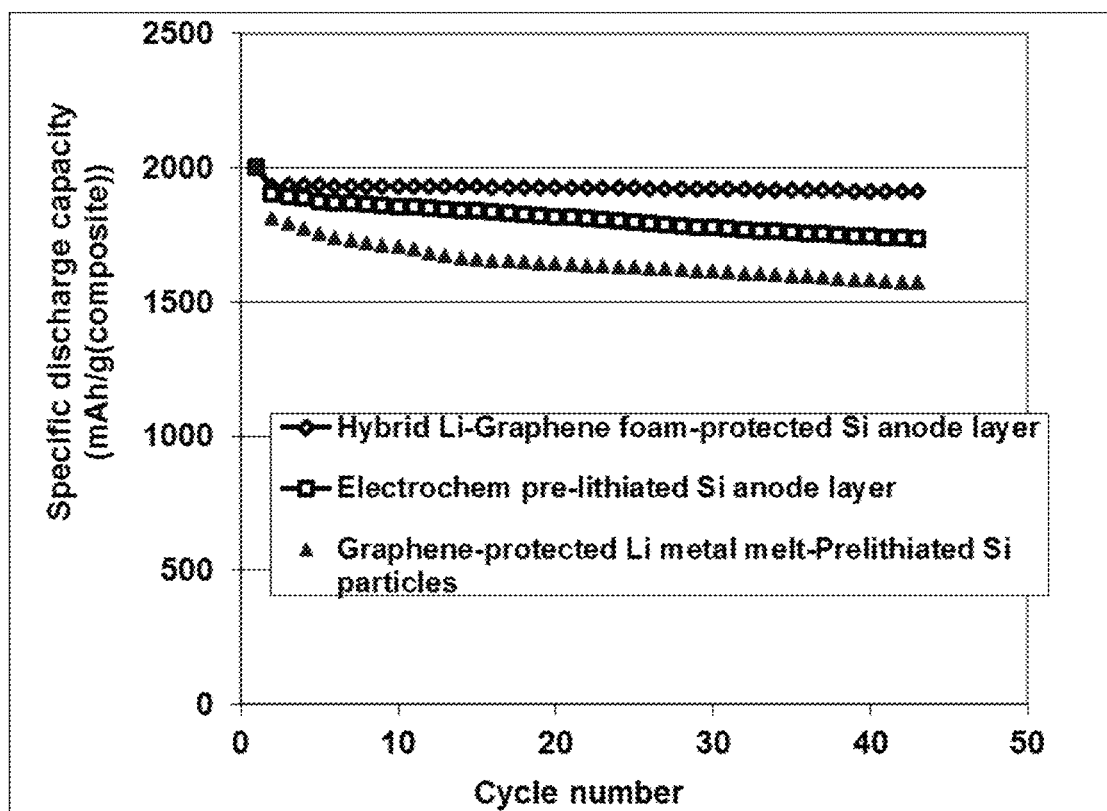
FIG. 4 Specific discharge capacities of three lithium-sulfur cells; first cell containing a hybrid Li metal-graphene foam-protected Si particles layer as the anode layer, second cell containing a layer of graphene foam-protected pre-lithiated Si particles as the anode layer, and third cell containing a layer of graphene-protected Li metal melt-lithiated Si particles as the anode layer.

As illustrated in FIG. 4, the specific discharge capacity of the anode in each cell was designed to be approximately 2,000 mAh per gram of (Si+C+expanded graphite+PVDF). These data indicate that the presently invented anode electrode delivers the highest first cycle efficiency (96%) and the most stable charge/discharge cycle behavior. After 37 cycles, this cell suffers a 0.8% capacity decay (from $2^{nd}$ cycle to $37^{th}$ cycle). The other two cells show a first cycle efficiency of 95% and 90%, respectively, and a capacity decay of 18% and 11%, respectively, after 37 cycles.

Example 2: Anode Electrode Containing $Co_3O_4$ Particles and Sulfur Cathode Containing S-Impregnated Carbon/Graphite Particles The electrochemical impregnation of S into pores of activated carbon fibers, activated carbon nanotubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-sulfur cell. The needed apparatus is similar to an electroplating system, which is well-known in the art.

In a typical procedure, a metal polysulfide ($M_xS_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating sulfur into pores was conducted at a current density in the range of 1 mA/g to 10 A/g, based on the layer weight of the porous carbon/graphite particles/fibers.

The chemical reactions that occur in this reactor may be represented by the following equation: $M_xS_y \rightarrow M_xS_{y-z}+zS$ (typically z=1-4). The sulfur coating thickness or particle diameter and the amount of S coating/particles impregnated may be controlled by the electro-chemical reaction current density, temperature and time. In general, a lower current density and lower reaction temperature lead to a more uniform impregnation of S and the reactions are easier to control. A longer reaction time leads to a larger amount of S saturated in the pores. Additionally, the electrochemical method is capable of rapidly converting the impregnated S into metal polysulfide (lithium polysulfide, sodium polysulfide, and potassium polysulfide, etc.).

Figure 5:
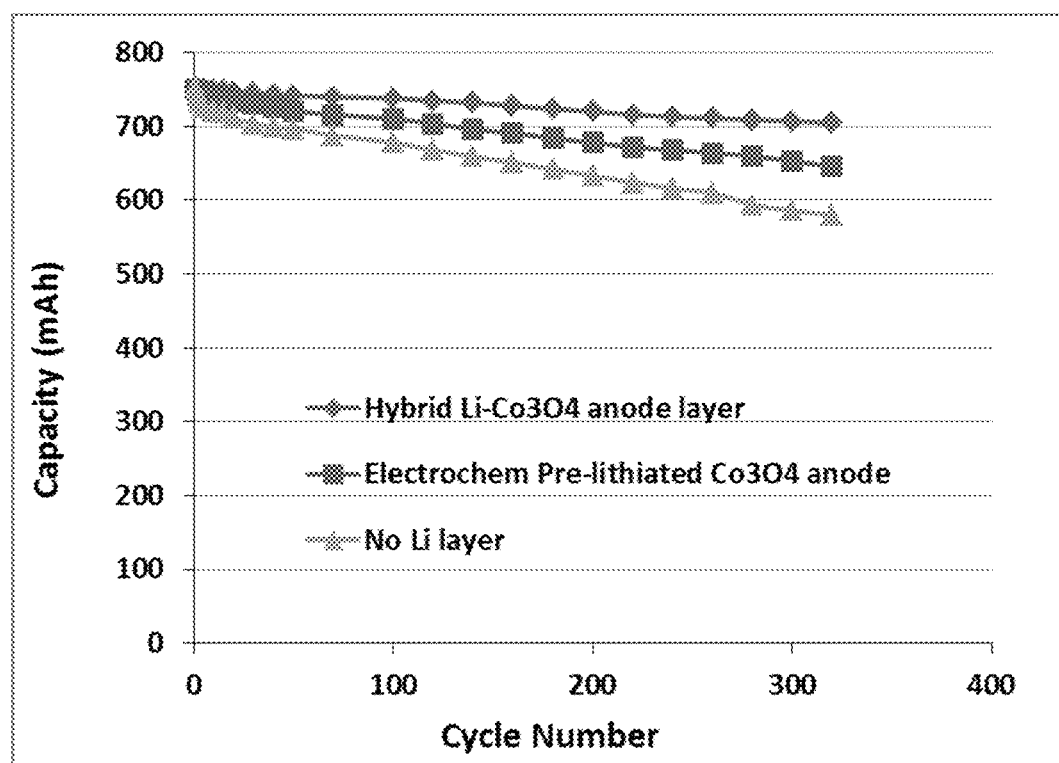
FIG. 5 Three pouch cells of Li—S were designed and prepared to deliver a cell capacity of approximately 750 mAh: the first cell featuring a presently invented hybrid lithium film-anode active material layer electrode, second one featuring a electrochemically pre-lithiated anode layer, and a third cell containing a conventional anode without an extra layer of lithium metal and without pre-lithiation of the anode layer.

Three pouch cells were designed and prepared to deliver a cell capacity of approximately 750 mAh: the first cell featuring a presently invented hybrid lithium film-anode active material layer electrode, second one featuring a electrochemically pre-lithiated anode layer, and a third cell containing a conventional anode without an extra layer of lithium metal and without pre-lithiation of the anode layer. FIG. 5 shows that the presently invented lithium-sulfur cell featuring a hybrid anode electrode delivers the most stable charge/discharge cycling behavior.

Example 3: Anode Electrode Containing Graphene-Encapsulated $SnO_2$ Particles and S-Impregnated Activated Carbon Fibers A chemical impregnation method was herein utilized to prepare S-impregnated carbon fibers that have been chemically activated. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+ \rightarrow (x-1)S+H_2S$.

Figure 6:
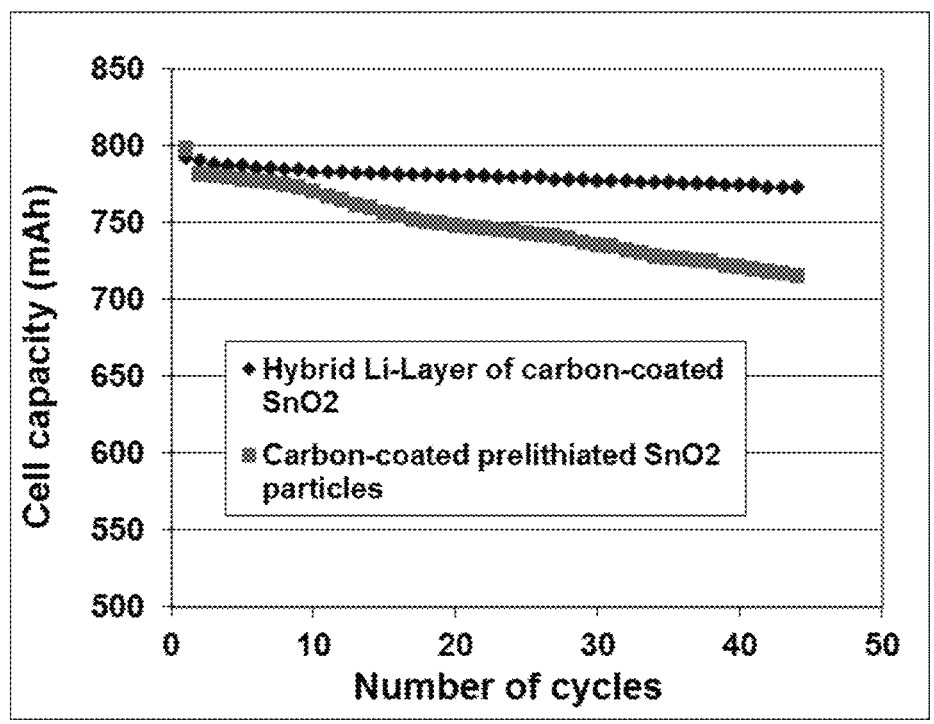
FIG. 6 The charge-discharge cycling behaviors of two Li-sulfur cells, each containing carbon-coated $SnO_2$ particles as the anode active material; one cell containing a lithium metal layer deposited on a surface of the anode active material layer and the other cell containing a layer of pre-lithiated $SnO_2$ particles.

Graphene-encapsulated $SnO_2$ particles were supplied by Angstron Energy Co. (Dayton, Ohio). These particles, along with acetylene black (AB, as a conductive additive) and SBR (as a binder resin), were slurry-coated on a Cu foil surface to form two separate anode active material layers (50 μm thick). One such layer was deposited with a thin layer of lithium metal (1.5 μm thick), but the other layer without a lithium coating (however, $SnO_2$ particles have been pre-lithiated in an external electro-chemical vessel). The anode electrodes were then made into two Li—S cells. FIG. 6 shows the cycling behaviors of the two cells. These data again demonstrate the advantages of following the instant hybrid anode approach to preparing lithium-ion batteries. The instant cell exhibits significantly more stable charge/discharge behavior.

Example 4: The Ethoxylated Trimethylopropane Triacrylate Monomer-Derived High-Elasticity Polymer In a representative procedure, the ethoxylated trimethylopropane triacrylate monomer (ETPTA, Mw=428, Sigma-Aldrich) was dissolved in a solvent mixture of ethylene carbonate (EC)/diethyl carbonate (DEC), at a weight-based composition ratios of the ETPTA/solvent of 3/97 (w/w). Subsequently, benzoyl peroxide (BPO, 1.0 wt. % relative to the ETPTA content) was added as a radical initiator to allow for thermal crosslinking reaction after mixing with cathode particles. Then, cathode active material particles (e.g. S-graphene particles) were dispersed in the ETPTA monomer/solvent/initiator solution to form a slurry, which was spray-dried to form ETPTA monomer/initiator-embraced S-graphene particles. These embraced particles were then thermally cured at 60° C. for 30 min to obtain the particulates composed of S-graphene particles encapsulated with a thin layer of a high-elasticity polymer. The ETPTA polymer shell thickness was varied from 1.3 nm to 115 nm.

On a separate basis, some amount of the ETPTA monomer/solvent/initiator solution was cast onto a glass surface to form a wet film, which was thermally dried and then cured at 60° C. for 30 min to form a film of cross-linked polymer. In this experiment, the BPO/ETPTA weight ratio was varied from 0.1% to 4% to vary the degree of cross-linking in several different polymer films. Some of the cured polymer samples were subjected to dynamic mechanical testing to obtain the equilibrium dynamic modulus, Ge, for the determination of the number average molecular weight (Mc) between two cross-link points and the corresponding number of repeat units (Nc), as a means of characterizing the degree of cross-linking.

Several tensile testing specimens were cut from each cross-link film and tested with a universal testing machine. Tensile testing results of BPO-initiated cross-linked ETPTA polymers indicate that this series of network polymers have an elastic deformation from approximately 230% to 700%. These data are for neat polymers without any additive. The addition of up to 30% by weight of a lithium salt typically reduces this elasticity down to a reversible tensile strain from 10% to 100%. In a separate sample, a thin film of such a polymer (1 nm-10 μm) may be implemented between a porous separator and a cathode active material layer.

Example 5: Mixing of Sulfur with Carbon/Graphite Particles Via Ball-Milling to Form Sulfur-Containing Particles Sulfur particles and particles of soft carbon (i.e. graphitizable disordered carbon), natural graphite, meso-phase carbon, expanded graphite flakes, carbon nanofibers, and graphene sheets (0% to 95% by weight of S in the resulting composite) were physically blended and then subjected to ball milling for 2-24 hours to obtain S-containing composite particles (typically in a ball or potato shape). The particles, having a typical size of 1-10 μm, containing various S contents, were then embraced with a thin layer of high-elasticity polymer. Some of the resulting particulates were then made into a layer of cathode.

Example 6: Simple Sulfur Melt or Liquid Solution Mixing

One way to combine sulfur with a conducting material (e.g. carbon/graphite particles) is to use a solution or melt mixing process. Highly porous activated carbon particles, chemically etched meso-carbon micro-balls (activated MCMBs), and exfoliated graphite worms were mixed with sulfur melt at 177-120° C. (slightly above the melting point of S, 115.2° C.) for 10-60 minutes to obtain sulfur-impregnated carbon particles for use in a sulfur cathode.

Example 7: Redox Chemical Reaction-Induced Impregnation of Sulfur in Activated MCMBs and Activated Needle Coke In this chemical reaction-based deposition process, sodium thiosulfate ($Na_2S_2O_3$) was used as a sulfur source and HCl as a reactant. An activated MCMB-water or activated needle coke-water suspension was prepared and then the two reactants (HCl and $Na_2S_2O_3$) were poured into this suspension. The reaction was allowed to proceed at 25-75° C. for 1-3 hours, leading to impregnation of S into pores of the activated structures. The reaction may be represented by the following reaction: $2HCl+Na_2S_2O_3 \rightarrow 2NaCl+S\downarrow+SO_2\uparrow+H_2O$.

It may be noted that the sulfur cathode materials prepared in Examples 1-7 can be used in Na—S and K—S cells as well, not just for the Li—S cell.

Example 8: Cycle Stability of Various Rechargeable Lithium Battery Cells

Several series of Li metal-sulfur and Li-ion sulfur cells were prepared using the presently invented hybrid anodes and different cathode layers. Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Summarized in FIG. 4 are the specific discharge capacities of three lithium-sulfur cells; first cell containing a hybrid structure of a Li metal film deposited on a layer of graphene foam-protected Si particles as the anode layer, second cell containing a layer of graphene foam-protected pre-lithiated Si particles as the anode layer, and third cell containing a layer of graphene-protected Li metal melt-lithiated Si particles as the anode layer. This hybrid anode layer has enabled the resulting Li—S cell to deliver the most stable charge-discharge cycle life.

FIG. 5 shows the charge-discharge responses of three pouch cells of Li—S that were designed and prepared to deliver an initial cell capacity of approximately 750 mAh: the first cell featuring a presently invented hybrid lithium film-anode active material layer electrode, second one featuring an electrochemically pre-lithiated anode layer, and a third cell containing a conventional anode without an extra layer of lithium metal and without pre-lithiation of the anode layer. Again, the instant hybrid anode structure imparts the best cycle stability to the Li—S cell.

Shown in FIG. 6 are the charge-discharge cycle behaviors of two Li-sulfur cells, each containing carbon-coated $SnO_2$ particles as the anode active material; one cell containing a lithium metal layer deposited on a surface of the anode active material layer and the other cell containing a layer of pre-lithiated $SnO_2$ particles. The above cycling stability data have further demonstrated the surprising superiority of the presently invented hybrid anode structure.

Additional experimental data have also demonstrated that the presence of a high-elasticity polymer embracing a sulfur-based cathode does not compromise the energy density of an alkali metal-sulfur cell based on the consideration that this polymer shell is normally less electron-conducting than a carbon coating and less ion-conducting than a liquid electrolyte. To the contrary, the energy density of the cell is actually improved. Furthermore, this approach of high-elasticity polymer embraced sulfur cathode active material essentially eliminates the so-called Shuttling Effect that is known to be a primary cause of capacity decay in conventional Li—S cells. The presently invented hybrid anode strategy also addresses the issues of dendrite formation. A combination of polymer embracing and hybrid anode layer strategies now make it possible to produce an ideal Li—S battery exhibiting exceptional energy density and long cycle life.

In summary, the present invention provides an innovative, versatile, and surprisingly effective platform materials technology that enables the design and manufacture of superior alkali metal-sulfur rechargeable batteries. The alkali metal-sulfur cell featuring a cathode layer containing particulates of sulfur-conducting material hybrid particles encapsulated by a high-elasticity polymer exhibits a high cathode active material utilization rate, high specific capacity, high specific energy, high power density, little or no shuttling effect, and long cycle life. When a hybrid anode structure is implemented, the lithium dendrite issue is also suppressed or eliminated in a Li—S, room temperature Na—S, or K—S cell.

The invention claimed is:

1. A rechargeable alkali metal-sulfur cell selected from lithium-sulfur cell, sodium-sulfur cell, or potassium-sulfur cell, said alkali metal-sulfur cell comprising:
   (A) an anode comprising (i) an anode active material layer composed of fine particles of a first anode active material having an average particle size from 1 nm to 10 µm, an optional conductive additive, and an optional binder that bonds said fine particles and said conductive additive together to form said anode active material layer of structural integrity and, prior to assembly of said cell, (ii) a layer of an alkali metal or alkali metal alloy having greater than 50% by weight of lithium, sodium, or potassium therein, wherein said layer of alkali metal or alkali metal alloy is in physical contact with said anode active material layer and provides from 1% to 120% of a required alkali metal storage capacity of said anode;
   (B) a cathode comprising a cathode active material layer and an optional cathode current collector supporting said cathode active material layer, wherein said cathode active material layer contains a sulfur-containing material selected from a sulfur-carbon hybrid, sulfur-graphite hybrid, sulfur-graphene hybrid, conducting polymer-sulfur hybrid, metal sulfide, a sulfur compound, elemental sulfur, or a combination thereof; and
   (C) an electrolyte in ionic contact with said anode active material layer and said cathode active material layer and an optional porous separator layer electronically isolating the anode from the cathode;
wherein lithium, sodium, or potassium ions or atoms from said alkali metal or alkali metal alloy diffuse into said first anode active material particles to form lithiated, sodiated, or potassiated anode particles after said battery is assembled and said anode is brought into contact with said electrolyte.

2. The rechargeable alkali metal-sulfur cell of claim 1, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

3. The rechargeable alkali metal-sulfur cell of claim 1, wherein said anode active material layer or the layer of alkali metal or alkali metal alloy further contains an amount of electrolyte.

4. The rechargeable alkali metal-sulfur cell of claim 1, wherein said first anode active material particles have an average particle size from 1 nm to 1 µm.

5. The rechargeable alkali metal-sulfur cell of claim 1, wherein said first anode active material particles have an average particle size from 1 nm to 100 nm.

6. The rechargeable alkali metal-sulfur cell of claim 1, wherein said first anode active material is selected from the group consisting of: (a) silicon (Si), germanium (Ge), tin (Sn), lead (Pb), antimony (Sb), bismuth (Bi), zinc (Zn), aluminum (Al), and cadmium (Cd); (b) alloys or intermetallic compounds of Si, Ge, Sn, Pb, Sb, Bi, Zn, Al, or Cd with other elements, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, or Cd, and their mixtures or composites; and (d) combinations thereof.

7. The rechargeable alkali metal-sulfur cell of claim 1, wherein said lithiated anode particles comprise a lithiated silicon represented by a chemical formula of $Li_4Si$, $Li_{4.4}Si$, or $Li_xSi$, wherein $0.02 \leq x \leq 4.4$.

8. The rechargeable alkali metal-sulfur cell of claim 1, wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

9. The rechargeable alkali metal-sulfur cell of claim 8, wherein said metal element M is selected from Li, Na, K, Mg, Zn, Cu, Ti, Ni, Co, Fe, or Al.

10. The rechargeable alkali metal-sulfur cell of claim 1, wherein said metal sulfide contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

11. The rechargeable alkali metal-sulfur cell of claim 1, wherein said carbon or graphite material in said cathode active material layer is selected from meso-phase pitch, meso-phase carbon, meso carbon micro-bead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

12. The rechargeable alkali metal-sulfur cell of claim 1, wherein said graphene is selected from pristine graphene, graphene oxide, reduced graphene oxide (RGO), graphene fluoride, nitrogenated graphene, hydrogenated graphene, doped graphene, functionalized graphene, or a combination thereof.

13. The rechargeable alkali metal-sulfur cell of claim 1, wherein said conducting polymer-sulfur hybrid contains an intrinsically conductive polymer selected from polyaniline, polypyrrole, polythiophene, polyfuran, a bi-cyclic polymer, a sulfonated derivative thereof, or a combination thereof.

14. The rechargeable alkali metal-sulfur cell of claim 1, wherein said anode active material layer contains a binder that is porous having a porosity level from 1% to 90%.

15. The rechargeable alkali metal-sulfur cell of claim 1, wherein said anode active material layer is porous having a porosity level from 1% to 50%.

16. The rechargeable alkali metal-sulfur cell of claim 1, wherein said cathode active material layer contains a binder that is an elastomer having a recoverable tensile elastic deformation from 2% to 700%.

17. The rechargeable alkali metal-sulfur cell of claim 1, wherein said anode further comprises an amorphous carbon or polymeric carbon that forms a coating on a surface of said fine particles or forms a matrix in which said fine particles are dispersed.

18. The rechargeable alkali metal-sulfur cell of claim 1, wherein said anode further comprises a protective material that forms a coating on a surface of said fine particles or forms a matrix in which said fine particles are dispersed.

19. The rechargeable alkali metal-sulfur cell of claim 18, wherein said protective material is selected from graphene, an electron-conducting polymer, an ion-conducting polymer, a carbon coating, or a combination thereof.

20. The rechargeable alkali metal-sulfur cell of claim 1, wherein said anode further comprises a second anode active material selected from particles of graphite, hard carbon, soft carbon, meso-carbon micro-bead, surface-modified graphite, carbon-coated graphite, or a combination thereof.

21. The rechargeable alkali metal-sulfur cell of claim 1, wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

22. The rechargeable alkali metal-sulfur cell of claim 1, wherein said electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$, Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

23. The rechargeable alkali metal-sulfur cell of claim 1, wherein said electrolyte contains a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

24. A rechargeable alkali metal-sulfur cell selected from lithium-sulfur cell, sodium-sulfur cell, or potassium-sulfur cell, said alkali metal-sulfur cell comprising:
(A) an anode comprising (i) an anode active material layer composed of fine particles of a first anode active material having an average particle size from 1 nm to 10 μm, an optional conductive additive, and an optional binder that bonds said fine particles and said conductive additive together to form said anode active material layer of structural integrity and, prior to assembly of said cell, (ii) a layer of an alkali metal or alkali metal alloy having greater than 50% by weight of lithium, sodium, or potassium therein, wherein said layer of alkali metal or alkali metal alloy is in physical contact with said anode active material layer and provides from 1% to 120% of a required alkali metal storage capacity of said anode;
(B) a cathode comprising a cathode active material layer and an optional cathode current collector supporting said cathode active material layer, wherein said cathode active material layer contains a sulfur-containing material selected from a sulfur-carbon hybrid, sulfur-graphite hybrid, sulfur-graphene hybrid, conducting polymer-sulfur hybrid, metal sulfide, a sulfur compound, elemental sulfur, or a combination thereof; and
(C) an electrolyte in ionic contact with said anode active material layer and said cathode active material layer and an optional porous separator layer electronically isolating the anode from the cathode;
wherein said metal sulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

25. The rechargeable alkali metal-sulfur cell of claim 24, wherein said anode active material layer contains a binder that is porous having a porosity level from 1% to 90%.

26. The rechargeable alkali metal-sulfur cell of claim 24, wherein said anode active material layer is porous having a porosity level from 1% to 50%.

27. The rechargeable alkali metal-sulfur cell of claim 24, wherein said cathode active material layer contains a binder that is an elastomer having a recoverable tensile elastic deformation from 2% to 700%.

28. The rechargeable alkali metal-sulfur cell of claim 24, wherein said anode further comprises an amorphous carbon or polymeric carbon that forms a coating on a surface of said fine particles or forms a matrix in which said fine particles are dispersed.

29. The rechargeable alkali metal-sulfur cell of claim 24, wherein said anode further comprises a protective material that forms a coating on a surface of said fine particles or forms a matrix in which said fine particles are dispersed.

30. The rechargeable alkali metal-sulfur cell of claim 24, wherein said anode further comprises a second anode active material selected from particles of graphite, hard carbon, soft carbon, meso-carbon micro-bead, surface-modified graphite, carbon-coated graphite, or a combination thereof.

31. The rechargeable alkali metal-sulfur cell of claim 24, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

32. A rechargeable alkali metal-sulfur cell selected from lithium-sulfur cell, sodium-sulfur cell, or potassium-sulfur cell, said alkali metal-sulfur cell comprising:
(D) an anode comprising (i) an anode active material layer composed of fine particles of a first anode active material having an average particle size from 1 nm to 10 μm, an optional conductive additive, and an optional binder that bonds said fine particles and said conductive additive together to form said anode active material layer of structural integrity and, prior to assembly of said cell, (ii) a layer of an alkali metal or alkali metal alloy having greater than 50% by weight of lithium, sodium, or potassium therein, wherein said layer of alkali metal or alkali metal alloy is in physical contact with said anode active material layer and provides from 1% to 120% of a required alkali metal storage capacity of said anode;

(E) a cathode comprising a cathode active material layer and an optional cathode current collector supporting said cathode active material layer, wherein said cathode active material layer contains a sulfur-containing material selected from a sulfur-carbon hybrid, sulfur-graphite hybrid, sulfur-graphene hybrid, conducting polymer-sulfur hybrid, metal sulfide, a sulfur compound, elemental sulfur, or a combination thereof; and (F) an electrolyte in ionic contact with said anode active material layer and said cathode active material layer and an optional porous separator layer electronically isolating the anode from the cathode;

wherein said cathode active material layer contains a binder that is an elastomer having a recoverable tensile elastic deformation from 2% to 700%.

33. The rechargeable alkali metal-sulfur cell of claim 32, wherein lithium, sodium, or potassium ions or atoms from said alkali metal alkali metal alloy diffuse into said first anode active material particles to form lithiated, sodiated, or potassiated anode particles after said battery is assembled and said anode is brought into contact with said electrolyte.

34. The rechargeable alkali metal-sulfur cell of claim 32, wherein said anode active material layer contains a binder that is porous having a porosity level from 1% to 90%.

35. The rechargeable alkali metal-sulfur cell of claim 32, wherein said anode active material layer is porous having a porosity level from 1% to 50%.

36. The rechargeable alkali metal-sulfur cell of claim 32, wherein said anode further comprises an amorphous carbon or polymeric carbon that forms a coating on a surface of said fine particles or forms a matrix in which said fine particles are dispersed.

37. The rechargeable alkali metal-sulfur cell of claim 32, wherein said anode further comprises a protective material that forms a coating on a surface of said fine particles or forms a matrix in which said fine particles are dispersed.

38. The rechargeable alkali metal-sulfur cell of claim 32, wherein said anode further comprises a second anode active material selected from particles of graphite, hard carbon, soft carbon, meso-carbon micro-bead, surface-modified graphite, carbon-coated graphite, or a combination thereof.

39. The rechargeable alkali metal-sulfur cell of claim 32, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

* * * * *